(12) United States Patent
Thalmann

(10) Patent No.: US 7,353,425 B2
(45) Date of Patent: Apr. 1, 2008

(54) DATA PROCESSING CIRCUIT APPARATUS HAVING A DATA TRANSMISSION UNIT OF REDUNDANT DESIGN

(75) Inventor: Erwin Thalmann, Villach (AT)

(73) Assignee: Infineon Technologies AG, Munich (DE)

( * ) Notice: Subject to any disclaimer, the term of this patent is extended or adjusted under 35 U.S.C. 154(b) by 587 days.

(21) Appl. No.: 10/941,706

(22) Filed: Sep. 15, 2004

(65) Prior Publication Data
US 2005/0076267 A1  Apr. 7, 2005

(30) Foreign Application Priority Data
Oct. 2, 2003 (DE) ................. 103 45 981

(51) Int. Cl.
*G06F 11/00* (2006.01)
(52) U.S. Cl. ........................................... 714/11
(58) Field of Classification Search ............... 714/11, 714/9, 31, 43
See application file for complete search history.

(56) References Cited

U.S. PATENT DOCUMENTS

| | | | |
|---|---|---|---|
| 4,412,281 A * | 10/1983 | Works ............................ | 714/4 |
| 5,889,969 A * | 3/1999 | Getzlaff et al. ................. | 710/113 |
| 6,425,094 B1 * | 7/2002 | Drogichen et al. ............ | 714/41 |
| 6,530,045 B1 | 3/2003 | Cooper et al. | |
| 6,640,313 B1 * | 10/2003 | Quach ........................... | 714/10 |
| 6,760,868 B2 * | 7/2004 | Drogichen et al. ............ | 714/41 |
| 7,124,318 B2 * | 10/2006 | Luick ............................. | 714/10 |
| 7,185,341 B2 * | 2/2007 | Van Hensbergen ........... | 719/312 |
| 2002/0152421 A1 * | 10/2002 | Drogichen et al. ............ | 714/11 |
| 2004/0059862 A1 * | 3/2004 | Chan ............................. | 710/316 |

OTHER PUBLICATIONS

Rudak et al., "A Large-Area Integrated Multiprocessor System for Video Applications," *IEEE Design & Test of Computers*, pp. 6-17, Jan.-Feb. 2002.

* cited by examiner

*Primary Examiner*—Nadeem Iqbal
(74) *Attorney, Agent, or Firm*—Jenkins, Wilson, Taylor & Hunt, P.A.

(57) ABSTRACT

The invention provides a circuit apparatus having a circuit core module (100), a controller processor unit (102) for driving and addressing the circuit core module (100) and a data transmission unit (103*a*) for transmitting data between the circuit core module (100) and at least one external circuit module (110), provision being made of at least one further data transmission unit (103*b*-103*n*) that is of redundant design with respect to the data processing unit (103*a*), a data stream being changed over between the circuit core module (100) and the data transmission units (103*a*-103*n*) of multiply redundant design by means of a first changeover unit (201) and a data stream being changed over between the data transmission units (103*a*-103*n*) of multiply redundant design and the at least one external circuit module (110) by means of a second changeover unit (202).

9 Claims, 1 Drawing Sheet

FIG 2  Stand der Technik

DATA PROCESSING CIRCUIT APPARATUS HAVING A DATA TRANSMISSION UNIT OF REDUNDANT DESIGN

TECHNICAL FIELD

The present invention relates to circuit apparatuses in which data processing such as, for example, data storage is carried out and to methods for transmitting processed and/or stored data between a circuit core module and an external circuit module.

BACKGROUND ART

The present invention relates, in particular, to a data processing circuit apparatus having a circuit core module, a controller processor unit for driving and addressing the circuit core module and a data transmission unit for transmitting data between the circuit core module and at least one external circuit module.

FIG. 2 shows a conventional data processing circuit apparatus, a circuit core module (CORE) being connected to at least one external circuit module via a data processing unit (DP) and a data interface unit (DI).

The circuit core module receives control signals for controlling, by way of example, data storage in the circuit core module and/or data read-out from the circuit core module. The circuit core module is furthermore provided with address signals for addressing the data which are stored in the circuit core module and/or the data which are to be read from the circuit core module.

Whereas the circuit core module has a high degree of parallelism when processing data, the degree of parallelism for a data processing module DP and/or a data interface module DI is reduced when transmitting the data to an external circuit module (not shown). In this case, different processing speeds in the individual modules have a considerable effect on a data transfer rate or a data interchange rate between the circuit core module and external circuit modules.

The circuit core modules, for example semiconductor circuits (chips), are conventionally fabricated and offered in different speed classes. The circuit core modules comprise, for example, memory units, preferably DRAMs (Dynamic Random Access Memory).

The higher the speeds reached by the circuit core module when processing data, the higher the price secured for the entire circuit apparatus. In this case, a decisive factor for classification into speed classes is the magnitude of a maximum applicable clock frequency at which the circuit core module is still functional.

When determining a maximum clock frequency, it is disadvantageously not so much the circuit core module as the data processing module DP and/or the data interface module DI that is/are decisive.

When producing circuit apparatuses containing, for example, memory units, it is inexpedient that no attention is paid to different speed classes. It is only during the subsequent test methods in a test apparatus that the fabricated circuit apparatus is assigned to respective speed classes so that the highest retail price can respectively be secured.

In order to solve this problem, it has been proposed to first of all fabricate the circuit apparatuses containing the circuit core module COR, the data processing module DP and the data interface module DI, then to test them with regard to different speed requirements and finally to assign the circuit apparatuses which have been tested to the respective highest speed class. This conventional method has the considerable disadvantage that it is complicated and thus cost-intensive.

Furthermore, conventional circuit apparatuses cannot be used, for example, when the data processing module and/or the data interface module is/are defective. In this case, the entire circuit apparatus must be assessed as being defective and can no longer be used in any speed class.

It is disadvantageously not possible to set the conventional circuit apparatus to different, in particular high, frequencies so that a high retail price can be secured.

SUMMARY OF THE INVENTION

It is, therefore, an object of the present invention to provide a data processing circuit apparatus and a method for connecting a circuit core module to at least one external circuit module, in which it is possible to make optimum use of the operating speed of the circuit core module.

This object is achieved according to the invention by means of a circuit apparatus having the features of patent claim 1.

The object is furthermore achieved by means of a method specified in patent claim 7.

Further refinements of the invention emerge from the subclaims.

An essential concept of the invention involves designing speed-critical components of the circuit apparatus in a multiply redundant manner such that, when testing the circuit apparatus, that redundant component which has the highest speed can be selected.

Whereas the circuit core module has a high degree of parallelism when processing data and thus has a high operating speed, data processing modules and/or data interface modules which are connected between the circuit core module and external circuit units can be operated, in a manner dependent on production, at different operating speeds which may be considerably below the operating speed of the circuit core module.

The heart of the invention thus consists in designing the data processing modules and data interface modules (which are cost-effective in comparison with the circuit core module) in a multiply redundant manner such that the fastest data processing modules and/or data interface modules can respectively be selected in order to provide a higher-quality overall circuit apparatus.

In this case, the data processing module or the data processing unit and the data interface module or the data interface unit are combined in a data transmission unit that is of multiply redundant design. The invention now makes use of the fact that designing a data transmission unit of this type in a multiply redundant manner gives rise to costs which are lower than those incurred in increasing the total retail price that can be secured for the overall circuit apparatus if the latter can be classified in a higher speed class by suitably selecting a data transmission unit.

An essential advantage of the present invention is thus that the respective highest speed class can be selected. A further advantage of the present invention is that faults in data transmission units can be rectified, after the overall circuit apparatus has been fabricated, by selecting a further redundant data transmission unit instead of a defective data transmission unit.

The data processing circuit apparatus according to the invention essentially has:

a) a circuit core module;
b) a controller processor unit for driving and addressing the circuit core module; and c) a data transmission unit for transmitting data between the circuit core module and at least one external circuit module, the circuit apparatus furthermore having at least one further data transmission unit that is of redundant design with respect to the data transmission unit, a first changeover unit for changing over a data stream between the circuit core module and the data transmission units of multiply redundant design and a second changeover unit for changing over a data stream between the data transmission units of multiply redundant design and the at least one external circuit module.

Furthermore, the method according to the invention for connecting a circuit core module to at least one external circuit module essentially has the following steps:

a) providing a controller processor unit;
b) driving the circuit core module by means of control data which are supplied by the controller processor unit via a control bus;
c) addressing the circuit core module by means of addressing data which are supplied by the controller processor unit via an address bus; and
d) transmitting data between the circuit core module and the at least one external circuit module by means of a data transmission unit, provision being made of at least one further data transmission unit that is of redundant design with respect to the data transmission unit, a data stream being changed over between the circuit core module and the data transmission units of multiply redundant design by means of a first changeover unit and a data stream being changed over between the data transmission units of multiply redundant design and the at least one external circuit module by means of a second changeover unit.

Advantageous developments of, and improvements to, the respective subject matter of the invention are found in the subclaims.

In accordance with one preferred development of the present invention, the circuit core module has at least one memory unit. The at least one memory unit is preferably in the form of a DRAM memory (Dynamic Random Access Memory).

In accordance with another preferred development of the present invention, the data transmission units of redundant design each have a data processing unit for processing data and for forwarding data streams from and to the circuit core module.

In accordance with yet another preferred development of the present invention, the data transmission units of redundant design each have a data interface unit for coupling the circuit core module to the at least one external circuit module.

In accordance with yet another preferred development of the present invention, the first changeover unit for changing over a data stream between the circuit core module and the data transmission units of multiply redundant design can be changed over by means of a first test mode signal. The test mode signal is preferably provided in a manner dependent on speed range of the overall circuit apparatus, said speed range being determined during testing of the circuit apparatus.

In accordance with yet another preferred development of the present invention, the second changeover unit for changing over a data stream between the data transmission units of multiply redundant design and the at least one external circuit module can be changed over by means of a second test mode signal. Just like the first test mode signal, the second test mode signal is preferably provided in a test mode during testing of the overall circuit apparatus. It is advantageous that the test mode signal can be provided in a manner dependent on a particular maximum speed class of the overall circuit apparatus.

In accordance with yet another preferred development of the present invention, the at least one further data transmission unit that is of redundant design with respect to a first data transmission unit is selected with regard to a maximum data processing speed.

In accordance with yet another preferred development of the present invention, the at least one further data transmission unit that is of redundant design with respect to the first data transmission unit is selected, during testing of the circuit core module, in a manner dependent on a test mode.

BRIEF DESCRIPTION OF THE DRAWINGS

Exemplary embodiments of the invention are explained in more detail in the following description and are illustrated in the drawings, in which:

FIG. 2 shows a conventional data processing circuit apparatus.

DETAILED DESCRIPTION OF THE INVENTION

In the figures, identical reference symbols designate identical or functionally identical components or steps.

Figure 1:
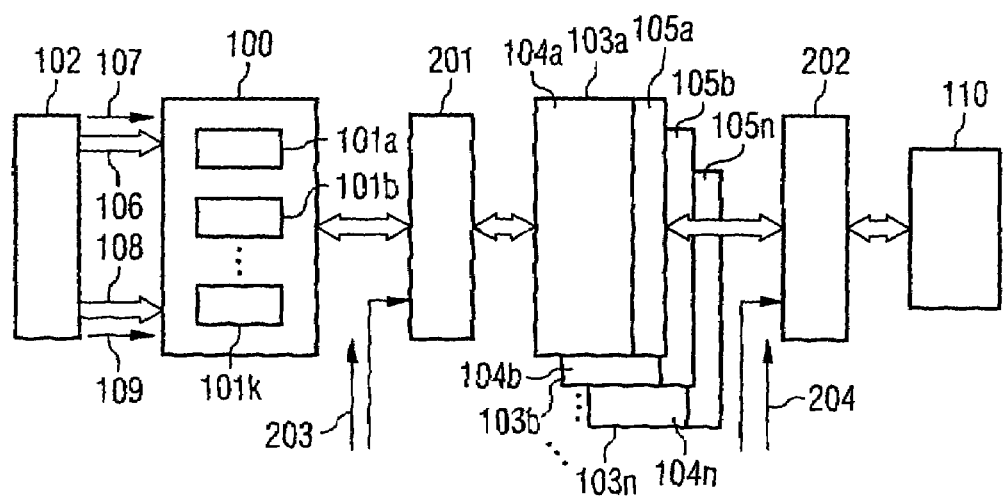
FIG. 1 shows a block diagram of the data processing circuit apparatus having data transmission units of multiply redundant design in accordance with a preferred exemplary embodiment of the present invention.
Figure 1:
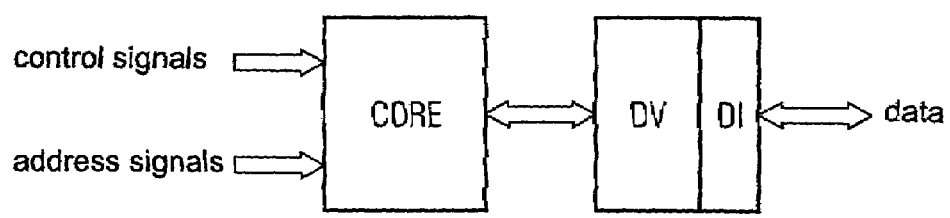

The block diagram shown in FIG. 1 in accordance with a preferred exemplary embodiment of the present invention shows a circuit core module 100 that is to be connected to at least one external circuit module 110. The double arrows shown in FIG. 1 denote data buses or data transmission channels via which data and data streams can be interchanged between the circuit core module 100 and the external circuit module 110.

As illustrated in FIG. 1, the data transmission unit 103a required for data interchange is of multiple design, that is to say a number n of additional redundant data transmission units 103b-103n are provided.

It should be pointed out that only one data transmission unit 103a-103n is required for interchanging data between the circuit core module 100 and the at least one external circuit module 110. According to the invention, a number of n data transmission units 103a-103n are provided in the overall circuit apparatus, said data transmission units having different data processing speeds on account of process conditions during their production. It should be pointed out that the circuit core module 100 may also have different data processing speeds but it cannot be provided in multiply redundant form for cost reasons.

It is furthermore advantageous that the circuit core module 100 has a high degree of parallelism when processing data, with the result that a maximum data processing speed of the overall circuit apparatus is always provided in the circuit core module 100. As illustrated in the preferred exemplary embodiment of FIG. 1, the circuit core module 100 has, for example, a number of memory units 101a-101k.

A controller processor unit 102 supplies the circuit core module 100 with control data 107 via a control bus 106 and addressing data 109 via an address bus 108. The memory units 101a-101k arranged in the circuit core module 100 can thus be addressed and data storage in, and data read-out from, the memory units 101a-101k can be provided by the controller processor unit 102.

It should be pointed out that, during operation of the data processing circuit apparatus according to the invention, only one of the data transmission units 103a-103n is activated and used during operation. After the overall circuit apparatus has been fabricated, it is, however, first of all tested for its functionality, a speed class also being determined during testing of this type. In this case, it is possible, in a manner dependent on test mode signals which have been supplied, in this case a first test mode signal 203 and a second test mode signal 204, to determine a data processing speed of the overall circuit arrangement in a manner dependent on a data transmission unit 103a-103n arranged between the circuit core module 100 and the at least one external circuit module 110. That is to say it is possible to test different data transmission units 103a-103n and to provide the one with a maximum data processing speed and/or data transmission speed for subsequent operation of the overall data processing circuit apparatus.

To this end, that is to say in order to provide for changing over between different data transmission units 103a-103n, a first changeover unit 201 is provided between the circuit core module 100 and the data transmission units 103a-103n and a second changeover unit 202 is provided between the data transmission units 103a-103n and the at least one external circuit module 110.

The corresponding changeover units 201, 202 are driven and changed over in a manner dependent on a test mode signal prescribed a test system. In this case, a data stream is changed over between the circuit core module 100 and the data transmission units 103a-103n of multiply redundant design by means of the first changeover unit 201 and a data stream is changed over between the data transmission units 103a-103n of multiply redundant design and the at least one external circuit module 110 by means of the second changeover unit 202.

According to the invention, the data transmission units 103a-103n of multiply redundant design each have a data processing unit 104a-104n and/or a data interface unit 105a-105n. Whereas the basic function of the circuit core module 100 is to provide storage and addressing of data, the basic function of the processing unit 104a-104n of the data transmission unit 103a-103n is to provide or convert data for a data protocol that is being used. The function of the data interface unit 105a-105n of the data transmission unit 103a-103n is to send data to the at least one external circuit module 110 and to receive data from the latter. The respective data interface unit 105a-105n of the selected data transmission unit 103a-103n thus represents the "interface" to the outside world.

While the changeover units 201 and 202 can be configured with the aid of first and second test mode signals 203, 204, it must be ensured that one of the data transmission units 103a-103n is respectively activated in order to maintain a data link. That data transmission unit 103a-103n in which the highest speed class was determined is selected and hard-wired during subsequent use of the overall circuit apparatus.

Reference is made to the introduction to the description as regards the conventional data processing circuit apparatus illustrated in FIG. 2.

Although the present invention was described above with reference to preferred exemplary embodiments, it is not restricted thereto but rather can be multifariously modified. Nor is the invention restricted to the application possibilities mentioned.

What is claimed is:

1. Data processing circuit apparatus having:
a) a circuit core module;
b) a controller processor unit for driving and addressing the circuit core module;
c) a data transmission unit for transmitting data between the circuit core module and at least one external circuit module, wherein the circuit apparatus furthermore has:
d) at least one further data transmission unit that is of redundant design with respect to the data transmission unit;
e) a first changeover unit for changing over a data stream between the circuit core module and the data transmission units of multiply redundant design, wherein the first changeover unit is changed over by means of a first test mode signal; and
f) a second changeover unit for changing over a data stream between the data transmission units of multiply redundant design and the at least one external circuit module, wherein the second changeover unit is changed over by means of a second test mode signal.

2. Apparatus according to claim 1, wherein the circuit core module has at least one memory unit.

3. Apparatus according to claim 1, wherein the data transmission units of redundant design each have a data processing unit for processing data and for forwarding data streams from and to the circuit core module.

4. Apparatus according to claim 1, wherein the data transmission units of redundant design each have a data interface unit for coupling the circuit core module to the at least one external circuit module.

5. Method for connecting a circuit core module to at least one external circuit module, having the following steps:
a) providing a controller processor unit;
b) driving the circuit core module by means of control data which are supplied by the controller processor unit via a control bus;
c) addressing the circuit core module by means of addressing data which are supplied by the controller processor unit via an address bus; and
d) transmitting data between the circuit core module and the at least one external circuit module by means of a data transmission unit,
wherein provision is made of at least one further data transmission unit that is of redundant design with respect to the data transmission unit, a data stream being changed over between the circuit core module and the data transmission units of multiply redundant design by means of a first changeover unit and a data stream being changed over between the data transmission units of multiply redundant design and the at least one external circuit module by means of a second changeover unit, wherein the first changeover unit is changed over by means of a first test mode signal and the second changeover unit is changed over by means of a second test mode signal.

6. Method according to claim 5, wherein data are processed and forwarded from and to the circuit core module by means of a data processing unit provided in each of the data transmission units of redundant design.

7. Method according to claim 5, wherein the circuit core module is coupled to the at least one external circuit module by means of a data interface unit provided in each of the data transmission units of redundant design.

8. Method according to claim 5, wherein the at least one further data transmission unit that is of redundant design is selected with regard to a maximum data processing speed.

9. Method according to claim 5, wherein the at least one further data transmission unit that is of redundant design is selected, during testing of the circuit core module, in a manner dependent on a test mode.

* * * * *